(12) United States Patent
Kumar et al.

(10) Patent No.: US 8,335,760 B1
(45) Date of Patent: Dec. 18, 2012

(54) GRID COMPUTING SYSTEM TO MANAGE UTILITY SERVICE CONTENT

(75) Inventors: Rajendra Kumar, Los Altos, CA (US); Xiang Song, Atlanta, GA (US)

(73) Assignee: Hewlett-Packard Development, L. P., Houston, TX (US)

( * ) Notice: Subject to any disclaimer, the term of this patent is extended or adjusted under 35 U.S.C. 154(b) by 1520 days.

(21) Appl. No.: 11/053,703

(22) Filed: Feb. 7, 2005

(51) Int. Cl.
*G06F 17/30* (2006.01)

(52) U.S. Cl. .................................... 707/609; 707/802

(58) Field of Classification Search .............. 707/100, 707/609, 802
See application file for complete search history.

(56) References Cited

U.S. PATENT DOCUMENTS

| | | | |
|---|---|---|---|
| 5,214,428 A * | 5/1993 | Allen | 341/20 |
| 7,164,518 B2 * | 1/2007 | Yang | 359/212.2 |
| 2002/0052885 A1 * | 5/2002 | Levy | 707/200 |
| 2003/0093790 A1 * | 5/2003 | Logan et al. | 725/38 |
| 2005/0024682 A1 * | 2/2005 | Hull et al. | 358/1.18 |
| 2005/0033755 A1 * | 2/2005 | Gokhale et al. | 707/100 |
| 2005/0068572 A1 * | 3/2005 | Hart et al. | 358/1.15 |
| 2005/0071746 A1 * | 3/2005 | Hart et al. | 715/500.1 |
| 2005/0128551 A1 * | 6/2005 | Yang | 359/214 |
| 2005/0163108 A1 * | 7/2005 | Moore et al. | 370/352 |
| 2006/0015609 A1 * | 1/2006 | Hagale et al. | 709/224 |
| 2006/0120391 A1 * | 6/2006 | Basu et al. | 370/410 |
| 2006/0136235 A1 * | 6/2006 | Keohane et al. | 705/1 |
| 2007/0036293 A1 * | 2/2007 | Erhart et al. | 379/88.16 |
| 2007/0118901 A1 * | 5/2007 | Focke et al. | 726/22 |
| 2007/0185931 A1 * | 8/2007 | Stokes et al. | 707/203 |

* cited by examiner

*Primary Examiner* — Kim Nguyen

(57) ABSTRACT

A grid computing system for managing utility service content. A grid computing system comprises at least one node for storing utility service content and a repository for storing user profiles that define respective portions of the utility service content. The grid computing system further comprises a grid distributed resource manager coupled to the node storing the utility service content and the repository storing user profiles. The grid distributed resource manager is operable to access a requested portion of the utility service content from the node based on a received user profile.

21 Claims, 18 Drawing Sheets

META-DATA REPOSITORY

(STORAGE SERVICE) 60

| 302 | OBJECT NAME |
|---|---|
| 304 | OBJECT ATTRIBUTES LOCATION (STORAGE UNIT/GRID) |
| 306 | OBJECT LOCATION (STORAGE UNIT/GRID) |
| 308 | OBJECT EXTENSION |
| 310 | OBJECT TYPE (APP/DATA) |
| 312 | OBJECT INSTALL SCRIPT |
| 314 | OBJECT UNINSTALL SCRIPT |
| 316 | OBJECT TIME TO LIVE |
| 318 | OBJECT RECURRING SERVICE |
| 320 | OBJECT RECURRING TIME TO BIRTH |
| 322 | OBJECT RECURRING DURATION |
| 324 | OBJECT RECURRING DAY OF WEEK |
| 326 | OBJECT RECURRING USER NAME |
| 328 | OBJECT LAST ACCESS TIME |
| 330 | OBJECT SIZE ON DISK |
| 332 | OBJECT FOOTPRINT IN MEMORY |
| 334 | OBJECT SIGNATURE |
| 336 | OBJECT CERTIFICATE |
| 338 | OBJECT OWNER |
| 340 | OBJECT GROUP |
| 342 | OBJECT PERMISSIONS |
| 344 | OBJECT STATE (COMPRESSED/UNCOMPRESSED) |
| 346 | OBJECT COMPRESSION ALGORITHM |
| 348 | OBJECT PREFETCHING/CACHING: OBJECT PREFETCHED/ CACHED AT THE GRID EDGE? |
| 350 | OBJECT REPLACEMENT POLICY |

FIG. 3

META-DATA REPOSITORY

(WRAPPER SERVICE)

61

| 510 | APPLICATION NAME |
|---|---|
| 510 | APPLICATION ATTRIBUTES LOCATION (STORAGE UNIT/GRID) |
| 510 | APPLICATION LAST USE TIME |
| 510 | POINTER TO APPLICATION INSTALL SCRIPT |
| 510 | POINTER TO APPLICATION UNINSTALL SCRIPT |
| 510 | POINTER TO APPLICATION LOCATION IN GRID |
| 510 | APPLICATION ALREADY RESIDENT ON DEVICE? |
| 510 | TIME APPLICATION IS NEEDED |
| 510 | DURATION FOR WHICH APPLICATION IS NEEDED |
| 510 | REPEAT INTERVAL FOR THE APPLICATION USE |
| 510 | END DATA FOR THE APPLICATION USE |

FIG. 5

GRID COMPUTING SYSTEM TO MANAGE UTILITY SERVICE CONTENT

BACKGROUND OF THE INVENTION

1. Field of the Invention

Embodiments of the present invention generally relates to grid computing. More particularly, embodiments of the present invention relate to a grid computing system for managing utility service content delivered to devices coupled to the grid computing system.

2. Related Art

A storage unit is utilized to store objects (e.g., applications and data files). Examples of storage units include a magnetic disk drive, CD-ROM drive, an optical drive, a floppy disk drive, a hard disk drive, a magnetic tape drive, a RAM unit, a ROM unit, a PROM unit, an EPROM unit, a flash unit, and any other drive/unit on which objects may be stored. Due to technology advances, the size of the storage unit has been reduced while increasing its storage capacity.

Several factors are considered in deciding what storage unit to incorporate into a device (e.g., handheld device, stand-alone device, desktop device, etc.). One factor is the size of the device. To reduce the size of the device, storage units having smaller sizes are utilized. Another factor is storage capacity. If the device supports multiple applications and functionalities, the storage capacity of the storage unit has to be sufficiently large to accommodate these multiple applications and functionalities. Weight of the device is another factor. If the device is intended to be a handheld device, a storage unit having a less weight is utilized.

Although the factors described above (e.g., size, storage capacity, and weight) are important, cost of the device may be the most influential factor. Typically, smaller size, greater storage capacity, and less weight increase the cost of the device. The various examples of storage units given above represent different storage technologies. Each storage technology has a corresponding cost affected by size, storage capacity, and weight. Typically, the ideal storage unit having the ideal size, ideal storage capacity, the ideal weight, and the ideal cost for the device is not available. Thus, size, storage capacity, and weight are compromised to achieve the target cost.

Devices are used for various utility services, such as downloading media files for play on the device. However, in order to keep the size, weight, and cost of the device low, a typical device has significantly less storage for holding media files than many users desire. Furthermore, a typical user may own several devices that are able to play media content. However, the media content must be downloaded and stored individually on each device. Furthermore, some devices do not have efficient ways of managing the media content such that a user may intelligently query the stored information.

SUMMARY OF THE INVENTION

A grid computing system for managing utility service content is disclosed. In an embodiment, a grid computing system comprises at least one node for storing utility service content and a repository for storing user profiles that define respective portions of the utility service content. The grid computing system further comprises a grid distributed resource manager coupled to the node storing the utility service content and the repository storing user profiles. The grid distributed resource manager is operable to access a requested portion of the utility service content from the node based on a received user profile.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 3 illustrates a meta-data repository for a storage service in accordance with an embodiment of the present invention.

FIG. 5 illustrates a meta-data repository for a wrapper service in accordance with an embodiment of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Although the discussion will focus on an external storage resource comprising a grid computing system, it should be understood that the external storage resource may be implemented differently. A stand-alone unit (e.g., a server) and a server infrastructure having multiple servers networked together are examples of other implementations for the external storage resource.

As described above, the selection of a storage unit for a device may determine whether the device is a commercial success or a commercial failure. Instead of being limited to the selected storage unit and its limitations, the device is provided with services to manage the storage of and access to objects (e.g., data files and applications) on the device. The services may be implemented in software, hardware, or a combination of software and hardware. These services employ an external storage resource (e.g., a grid computing system) to provide the illusion of unlimited storage capacity and access to an unlimited number of objects (e.g., data files and applications). Further, these services seamlessly operate in an automated manner with minimal effort from the user of the device.

Core Services

Figure 1A:
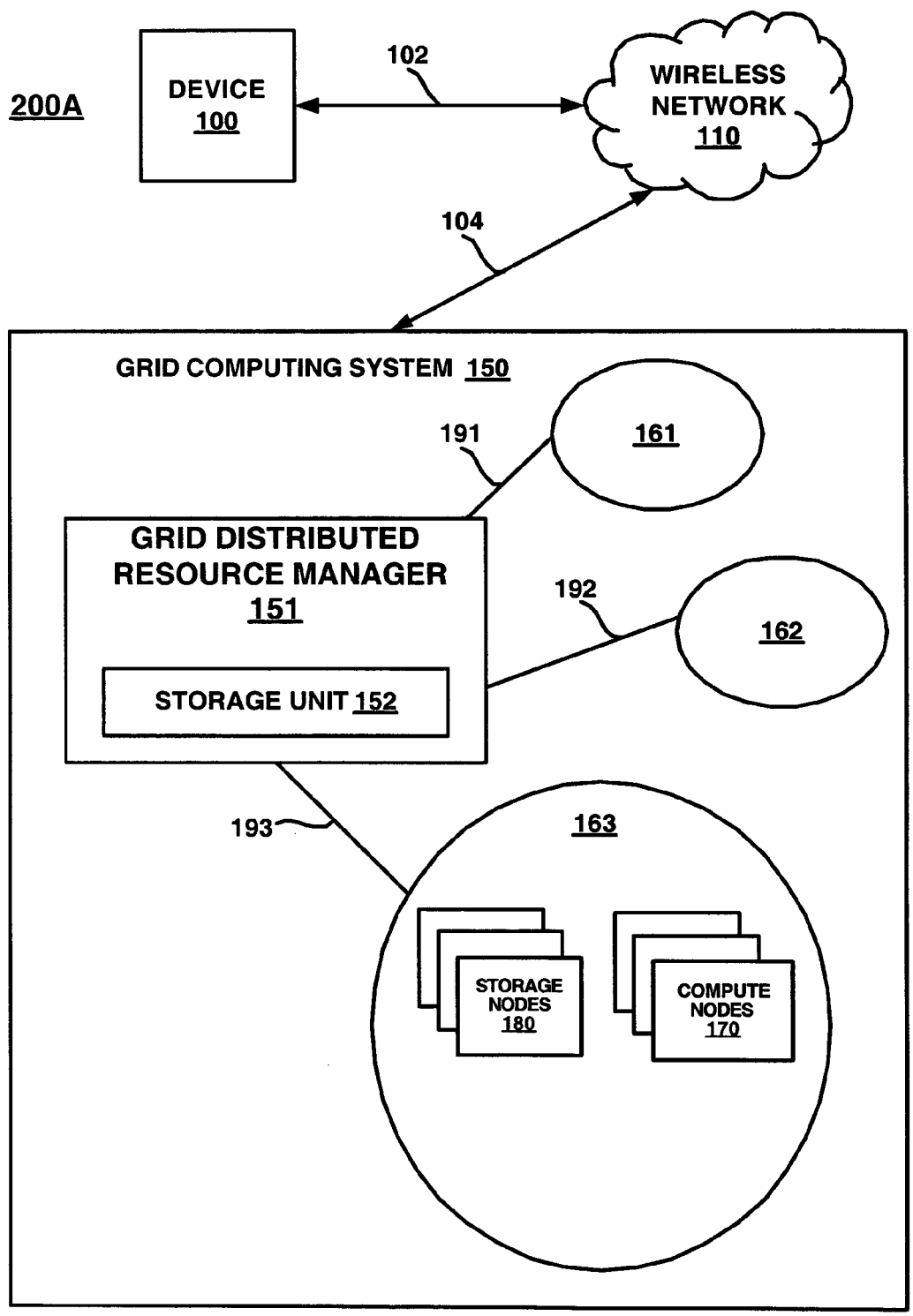
FIG. 1A illustrates a system utilizing a wireless network in accordance with an embodiment of the present invention.

FIG. 1A illustrates a system 200A utilizing a wireless network 110 in accordance with an embodiment of the present invention. The system 200A includes a grid computing system 150, a wireless network 110, and a device 100. The wireless network 110 may be any type of wireless network. The device 100 is coupled to the wireless network 110 via wireless connection 102. Moreover, the grid computing system 150 is coupled to the wireless network 110 via wireless connection 104. The device 100 may be any type of device (e.g., handheld device, stand-alone device, desktop device, etc.). Examples for the device 100 include a personal digital assistant (PDA), a mobile phone, a media (e.g., music, graphics, audio-visual, etc.) player, and a computer.

As will be described in detail below, the device 100 may have a service for managing storage of objects, a service for managing access to objects, services for managing storage of objects and for managing access to objects, or a service for managing access to utility service content. Examples of objects include applications and data files. These services use the grid computing system 150 via the wireless network 110 to provide the illusion of unlimited storage capacity and access to an unlimited number of objects (e.g., data files and applications). Hence, these services address the storage capacity constraints of the device 100 raised by its storage unit. Multiple embodiments for the device 100 and its services will be described with respect to FIGS. 2A, 2B, and 2C.

Focusing on the grid computing system 150, it enables the utilization of distributed resources (e.g., computing resources, storage resources, network bandwidth resources) by presenting the illusion of a single computer with many capabilities and functionalities. Typically, the grid computing system 150 integrates in a collaborative manner various networks so that the resources of each network are available to be used. Moreover, the grid computing system 150 generally has a grid distributed resource manager 151, which interfaces the grid computing system 150 with the external environment, and a plurality of grid subdivisions 161-163. Each grid subdivision 161-163 has the distributed resources. Each grid subdivision 161-163 includes a plurality of nodes, wherein a node provides a resource.

Jobs may be submitted to the grid computing system 150 via the grid distributed resource manager 151. The job may include input data, identification of an application to be utilized, and resource requirements for executing the job. The job may include other information. Typically, the grid computing system 150 uses a scheduler having a hierarchical structure to schedule the submitted jobs. The scheduler may perform tasks such as locating resources for the jobs, assigning jobs, and managing job loads.

Moreover, the grid computing system 150 is able to support or supplement services originating outside the grid computing system 150. That is, the grid computing system 150 is capable of supporting or supplementing the service for managing storage of objects and the service for managing access to objects of the device 100.

As depicted in FIG. 1A, the grid distributed resource manager 151 includes a storage unit 152. Additionally, the grid distributed resource manager 151 is coupled to the grid subdivisions 161-163 via connections 191, 192, and 193, respectively.

Each grid subdivision 161-163 has a plurality of networked components. These networked components include a plurality of nodes 170 and 180. Each grid subdivision 161-163 may have several types of nodes. The compute nodes 170 provide distributed computational resources. The storage nodes 180 provide distributed storage resources. The storage nodes 180 may support and supplement the service for managing storage of objects and the service for managing access to objects of the device 100 by storing these objects as well as meta-data repository attributes associated with the objects.

In accordance with one embodiment, the storage nodes 180 store utility service content. The utility service content may include, but is not limited to, audio (e.g., a music service), video (e.g., a movie service), games, and graphics. Meta-data, such as artist information, titles, etc. may also be included in the storage nodes 180. In accordance with one embodiment, the storage unit 152 stores information to assist in locating utility service content stored in one or more of the storage nodes 180. Furthermore, the storage unit 152 also comprises a repository for storing user profiles that define respective portions of the utility service content. The user profiles and utility service content are discussed more fully herein.

Figure 1B:
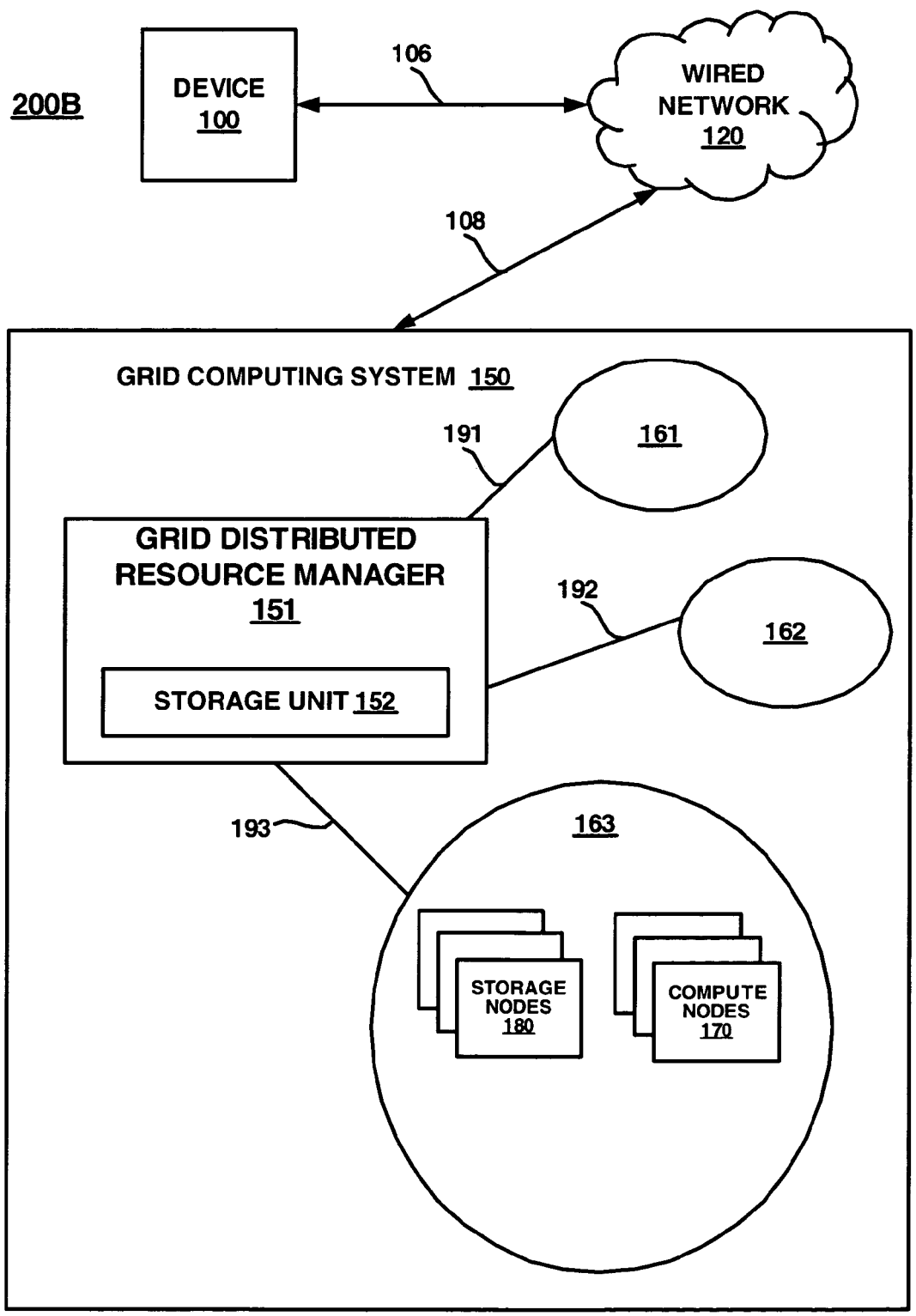
FIG. 1B illustrates a system utilizing a wired network in accordance with an embodiment of the present invention.

FIG. 1B illustrates a system 200B utilizing a wired network 120 in accordance with an embodiment of the present invention. Instead of a wireless network, the system 200B includes a wired network 120. The wired network 120 may be any type of wired network. The device 100 is coupled to the wired network 120 via wired connection 106. Moreover, the grid computing system 150 is coupled to the wired network 120 via wired connection 108. The discussion with respect to the device 100 and the grid computing system 150 of FIG. 1A is applicable to FIG. 1B.

Figure 2A:
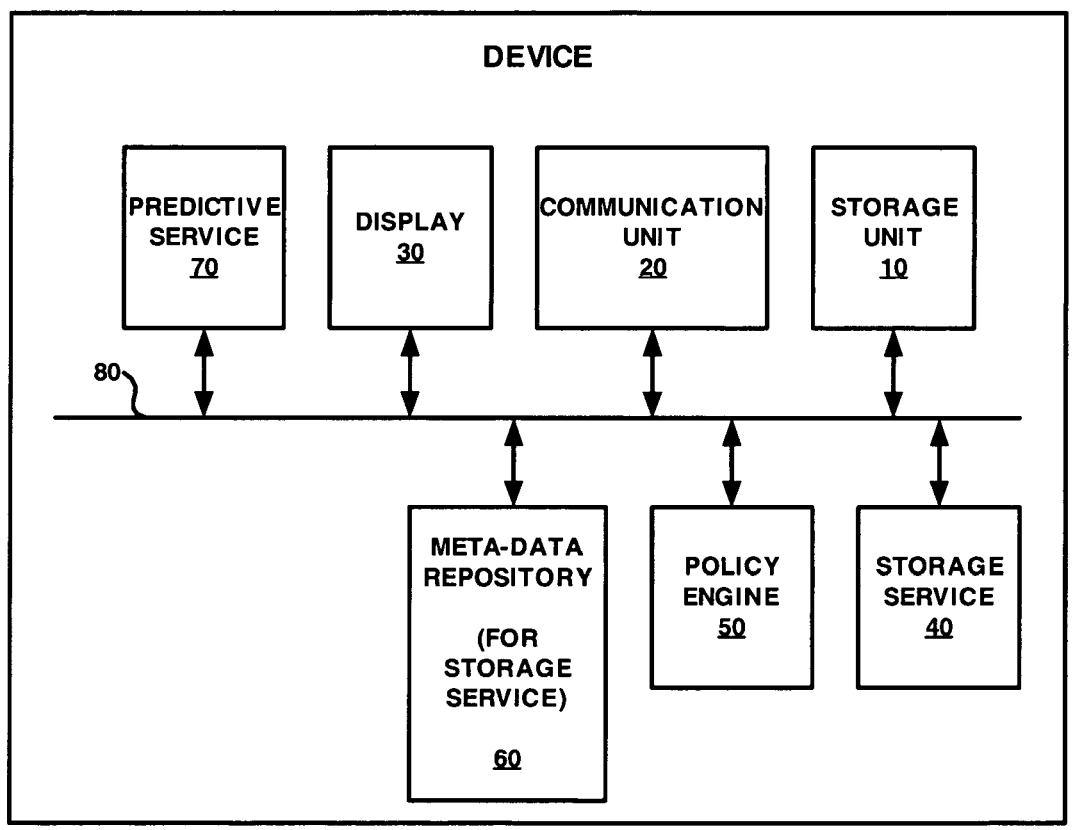
FIG. 2A illustrates a block diagram of the device of FIGS. 1A and 1B in accordance with a first embodiment of the present invention.

FIG. 2A illustrates a block diagram of the device 100 of FIGS. 1A and 1B in accordance with a first embodiment of the present invention. As depicted in FIG. 2A, the device 100 includes a storage unit 10, a communication unit 20, a display 30, a storage service 40, a policy engine 50, a meta-data repository 60, a predictive service 70, and one or more communication buses 80.

The storage unit 10 is utilized to store objects (e.g., applications and data files). Examples of storage units include a magnetic disk drive, CD-ROM drive, an optical drive, a floppy disk drive, a hard disk drive, a magnetic tape drive, a RAM unit, a ROM unit, a PROM unit, an EPROM unit, a flash unit, and any other drive/unit on which objects may be stored.

Further, the communication unit 20 is capable of communicating with external devices/systems. In particular, the communication unit 20 communicates with the grid computing system 150. The communication unit 20 may comprise a wireless communication unit for using the wireless network 110 described in FIG. 1A to communicate with the grid computing system 150. Also, the communication unit 20 may comprise a wired communication unit for using the wired network 120 described in FIG. 1B to communicate with the grid computing system 150.

The meta-data repository 60 is utilized to store attributes associated with the objects (e.g., applications and data files). In an embodiment, the meta-data repository 60 is a portion of the storage unit 10. FIG. 3 describes the meta-data repository 60. The policy engine 50 includes a plurality of policies that influence the operation of the storage service 40. These policies include default policies, user-specified policies, and policies based on user usage patterns of the device 100.

Continuing with FIG. 2A, the storage service 40 manages the storage utilization level of the storage unit 10. It uses the grid computing system 150, the policy engine 50, and the meta-data repository 60 attributes in managing the storage utilization level of the storage unit 10. The storage service 40 may be implemented in software, hardware, or a combination of software and hardware. In practice, it seamlessly operates in an automated manner with minimal effort from the user of the device 100.

The storage service 40 addresses the storage capacity constraints of the device 100 raised by its storage unit 10. It uses the grid computing system 150 via the wireless network 110 or wired network 120 to provide an unlimited storage capacity for objects (e.g., data files and applications). That is, if there is a need to reduce the storage utilization level of the storage unit 10, the storage service 40 makes available free space in the storage unit 10 to reduce the storage utilization level of the storage unit 10. For example, if a 70 MB (megabyte) data file needs to be stored in the storage unit 10 when it only has 30 MB of free space available, the storage service 40 makes available sufficient free space in the storage unit 10 to reduce the storage utilization level and store the 70 MB (megabyte) data file.

Moreover, the storage service 40 is able to reduce the storage utilization level of the storage unit 10 in several ways. Although the discussion will focus on applications and data files, the discussion is equally applicable to other types of objects stored in the storage unit 10. For instance, the storage service 40 may flush all or at least a portion of the data files from the storage unit 10 to the grid computing system 150 via the communication unit 20, reducing the storage utilization level. The grid computing system 150 then stores the data files in a storage node 180. Also, the storage service 40 may uninstall at least one of the applications from the storage unit 10, reducing the storage utilization level. In this case, the grid computing system 150 stores a copy of the uninstalled application for reinstallation on the device 100 at a later time. Further, the storage service 40 may compress all or at least a portion of the data files in the storage unit 10, reducing the storage utilization level. One or more of these techniques may be used if there is a need to reduce the storage utilization level of the storage unit 10.

As noted above, the policy engine 50 includes a plurality of policies that influence the operation of the storage service 40. Specific policies address how the storage service 40 should operate if any various scenarios arise, how to maintain efficient and productive use of the device's 100 resources, how to select one or more appropriate techniques to reduce the storage utilization level of the storage unit 10, how to manage the meta-data repository 60 attributes, and how to respond to the predictive service 70.

The storage service 40 monitors the storage utilization level of the storage unit 10 and maintains/updates the meta-data repository 60, which stores attributes associated with the applications and data files of the device 100. Furthermore, the storage service 40 periodically flushes the attributes to the grid computing system 150 via the communication unit 20, making available space in the meta-data repository 60.

Still referring to FIG. 2A, the predictive service 70 identifies objects (e.g., data files and applications) that will be needed within a predetermined future time period and initiates tasks to insure availability of the identified objects by interacting with the storage service 40. This enables the pre-fetching of objects (e.g., data files and applications), which are predicted to be needed in the near future. For example, if a compressed object is predicted to be needed in the near future, the compressed object may be uncompressed by the storage service 40 ahead of its actual use for speedier access to the object by the user of the device 100. Further, if an uninstalled application is predicted to be needed in the near future, the uninstalled application may be retrieved from the grid computing system 150, installed and configured by the storage service 40 ahead of its actual use for speedier access to the application by the user of the device 100. Also, if a flushed data file is predicted to be needed in the near future, the data file may be retrieved from the grid computing system 150 by the storage service 40 ahead of its actual use for speedier access to the data file by the user of the device 100.

The predictive service 70 may utilize data mining techniques and analysis techniques to infer and predict the user's access patterns to data files and applications. This pre-fetching of objects may be hierarchical. That is, the object may be retrieved from the storage node 180 of the grid computing system 150 and stored in another node that is on the edge of the grid computing system 150 and is closer to the device 100. Alternatively, the object may be retrieved from the storage node 180 of the grid computing system 150 and stored in the device 100.

The device 100 has several advantages. The performance is improved since the resources of the device 100 are better utilized. Also, the device 100 simplifies and automates the efforts of the user to manage data files and applications under the constraints of the storage unit 10 of the device 100.

Figure 2B:
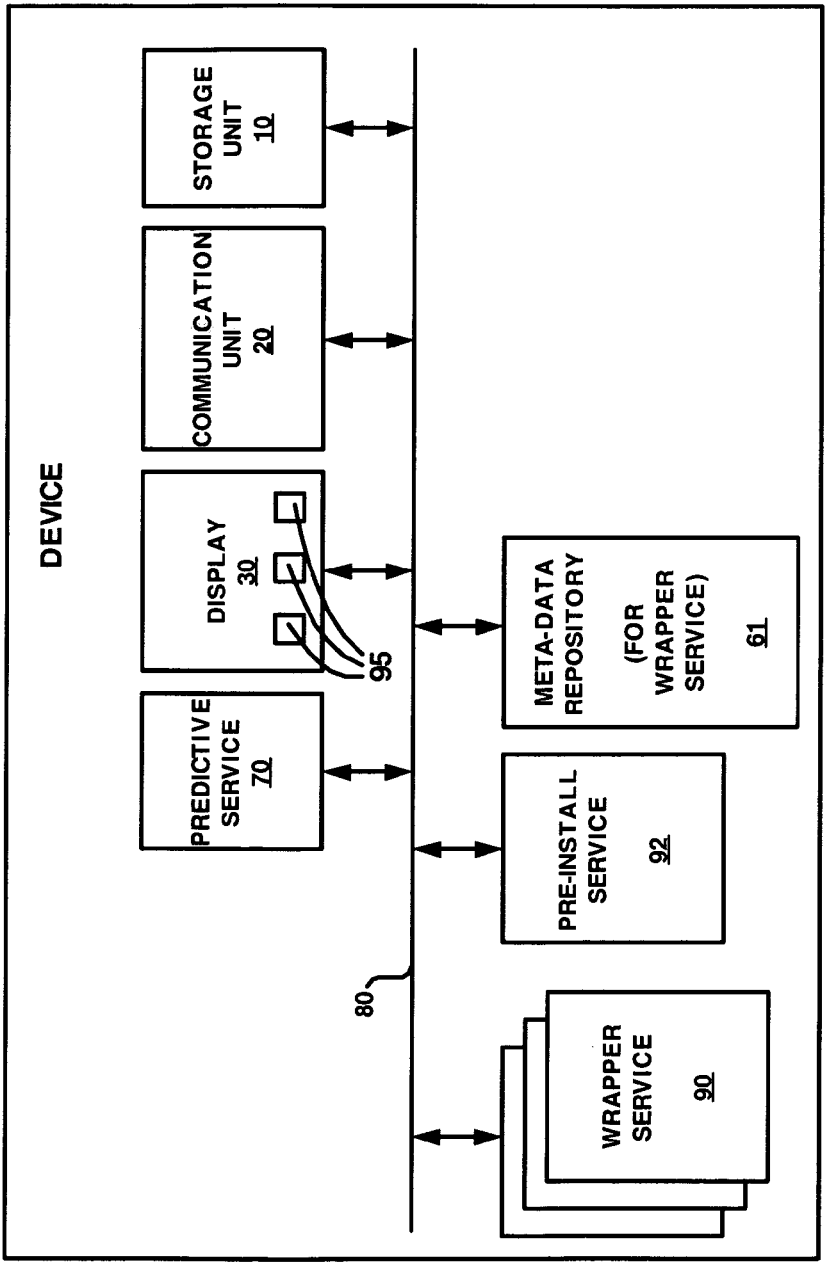
FIG. 2B illustrates a block diagram of the device of FIGS. 1A and 1B in accordance with a second embodiment of the present invention.

FIG. 2B illustrates a block diagram of the device 100 of FIGS. 1A and 1B in accordance with a second embodiment of the present invention. As depicted in FIG. 2B, the device 100 includes a storage unit 10, a communication unit 20, a display 30, a meta-data repository 61, a predictive service 70, one or more communication buses 80, one or more wrapper services 90, a pre-install service 92, and one or more icons 95 displayed on the display device 30, wherein each icon 95 is associated with one of the wrapper services 90 and an object (e.g., applications and data files).

The storage unit 10 is utilized to store objects (e.g., applications and data files). Examples of storage units include a magnetic disk drive, CD-ROM drive, an optical drive, a floppy disk drive, a hard disk drive, a magnetic tape drive, a RAM unit, a ROM unit, a PROM unit, an EPROM unit, a flash unit, and any other drive/unit on which objects may be stored.

Further, the communication unit 20 is capable of communicating with external devices/systems. In particular, the communication unit 20 communicates with the grid computing system 150. The communication unit 20 may comprise a wireless communication unit for using the wireless network 110 described in FIG. 1A to communicate with the grid computing system 150. Also, the communication unit 20 may comprise a wired communication unit for using the wired network 120 described in FIG. 1B to communicate with the grid computing system 150.

The meta-data repository 61 is utilized to store attributes associated with the objects (e.g., applications and data files). In an embodiment, the meta-data repository 61 is a portion of the storage unit 10. FIG. 5 describes the meta-data repository 61. The pre-install service 92 enables the user of the device 100 to specify one or more objects (e.g., applications and data files) the user desires to access presently or in the future. Thereafter, the pre-install service 92 installs or loads at least a portion of the specified objects (e.g., applications and data files) in the storage unit 10. The pre-install service 92 determines which specified objects to install or load based on available space in the storage unit 10 and policies such as default policies, user-specified policies, and policies based on user usage patterns of the device 100. It also updates the meta-data repository 61, which stores attributes associated with the specified objects. Further, the pre-install service 92 creates a wrapper service 90 and an icon 95 for each of the specified objects.

Continuing with FIG. 2B, each wrapper service 90 is associated with a corresponding object. Each wrapper service 90 provides a user access to the corresponding object using the grid computing system 150, the storage unit 10, and the meta-data repository 61 attributes irrespective of a storage location of the corresponding object. That is, the corresponding object does not have to presently be on the device 100 in order to be accessible by the user. Each wrapper service 90 may be implemented in software, hardware, or a combination of software and hardware. In practice, it seamlessly operates in an automated manner with minimal effort from the user of the device 100.

Each wrapper service 90 addresses the storage capacity constraints of the device 100 raised by its storage unit 10. It uses the grid computing system 150 via the wireless network 110 or wired network 120 to provide the user access to an unlimited number of objects (e.g., data files and applications). That is, if the user wants to access a particular object, the corresponding wrapper service 90 provides a user access to the particular object. For example, if the user clicks on an icon 95 associated with an object, the corresponding wrapper service 90 is invoked. If the object is an application, the corresponding wrapper service 90 uses the meta-data repository 61 attributes to determine where the application is stored (e.g., whether stored in storage unit 10, whether stored in grid computing system 150, etc.) and then provides the user access to the application.

Moreover, the corresponding wrapper service 90 is able to provide the user access to the application in several ways. Although the discussion will focus on applications, the discussion is applicable to data file and other types of objects stored in the storage unit 10. For instance, if the application is stored in the storage unit 10, the corresponding wrapper service 90 launches the application. Further, if the application is not stored in the storage unit 10 but is available from the grid computing system 150, the corresponding wrapper service downloads the application from the grid computing system 150 to the storage unit 10 via the communication unit 20, installs the application, and launches the application. If there is a need to reduce the storage utilization level of the storage unit 10 to accommodate the application, the service for managing storage of objects described with respect to FIG. 2A may be utilized.

The wrapper services 90 also maintain/update the meta-data repository 61, which stores attributes associated with the applications and data files of the device 100. Furthermore, the attributes may be periodically flushed to the grid computing system 150 via the communication unit 20, making available space in the meta-data repository 61.

Still referring to FIG. 2B, the predictive service 70 identifies objects (e.g., data files and applications) that will be needed within a predetermined future time period and initiates tasks to insure availability of the identified objects by interacting with the wrapper services 90. This enables the pre-fetching of objects (e.g., data files and applications), which are predicted to be accessed in the near future. For example, if an uninstalled application is predicted to be accessed in the near future, the uninstalled application may be retrieved from the grid computing system 150, installed and configured by the corresponding wrapper service 90 ahead of its actual use for speedier access to the application by the user of the device 100. Also, if a data file, which is not stored in the storage unit 10 but is available from the grid computing system 150, is predicted to be accessed in the near future, the data file may be retrieved/downloaded from the grid computing system 150 by the corresponding wrapper service 90 ahead of its actual use for speedier access to the data file by the user of the device 100.

The predictive service 70 may utilize data mining techniques and analysis techniques to infer and predict the user's access patterns to data files and applications. This pre-fetching of objects may be hierarchical. That is, the object may be retrieved from the storage node 180 of the grid computing system 150 and stored in another node that is on the edge of the grid computing system 150 and is closer to the device 100. Alternatively, the object may be retrieved from the storage node 180 of the grid computing system 150 and stored in the device 100.

Again referring to FIG. 2B, the device 100 has several advantages. The performance is improved since the resources of the device 100 are better utilized. Also, the device 100 simplifies and automates the efforts of the user to access data files and applications under the constraints of the storage unit 10 of the device 100.

Figure 2C:
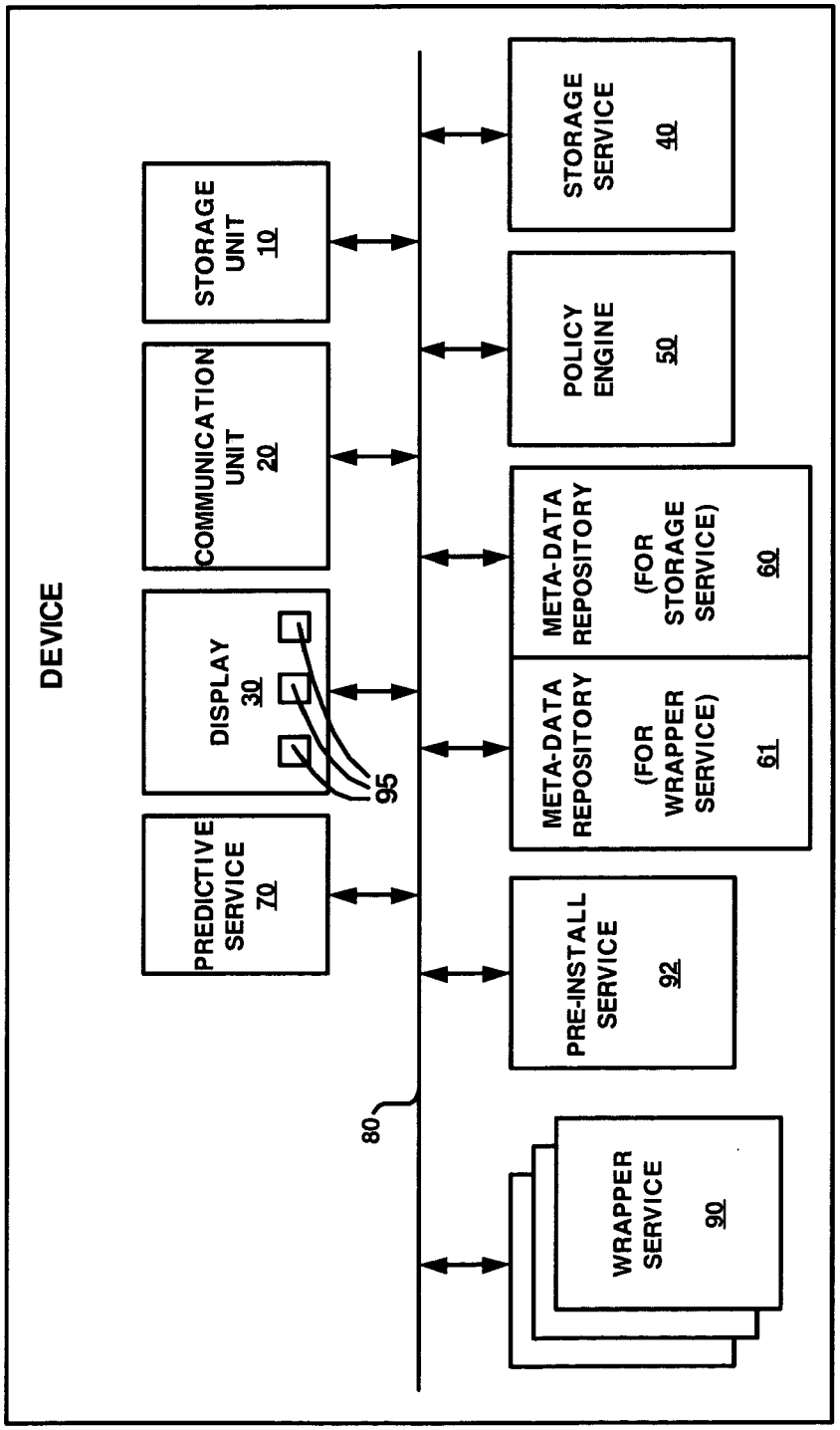
FIG. 2C illustrates a block diagram of the device of FIGS. 1A and 1B in accordance with a third embodiment of the present invention.

FIG. 2C illustrates a block diagram of the device 100 of FIGS. 1A and 1B in accordance with a third embodiment of the present invention. As depicted in FIG. 2C, the device 100 includes a storage unit 10, a communication unit 20, a display 30, a storage service 40, a policy engine 50, a meta-data repository 60 associated with the storage service 40, a predictive service 70, and one or more communication buses 80. Further, the device 100 has one or more wrapper services 90, a pre-install service 92, a meta-data repository 61 associated with the wrapper service 90 and pre-install service 92, and one or more icons 95 displayed on the display device 30, wherein each icon 95 is associated with one of the wrapper services 90 and an object (e.g., applications and data files).

It should be understood that in FIG. 2C the device 100 includes a service for managing storage of objects, which was described with respect to FIG. 2A, and a service for managing access to objects, which was described with respect to FIG. 2B. The discussion with respect to the service for managing storage of objects of FIG. 2A and the discussion with respect to the service for managing access to objects of FIG. 2B is applicable to FIG. 2C.

FIG. 3 illustrates a meta-data repository 60 for a storage service 40 (FIG. 2A) in accordance with an embodiment of the present invention. As shown in FIG. 3, the meta-data repository 60 has a plurality of attributes 302-350 for each object (e.g., applications and data files). These attributes 302-350 may be set by the user or by the storage service 40. Moreover, some of the attributes 302-350 are not used for some types of objects.

The attribute 316 is time to live (TTL). This attribute 316 enables the user to specify the time for which an object should exist on the storage unit 10 (FIG. 2A) of the device 100 (FIG. 2A). Alternatively, the storage service 40 may assign a TTL value to the attribute 316 based on any criteria (e.g., user usage patterns, heuristics, etc.). At the expiration of the TTL value assigned to attribute 316, a data file may be compressed or flushed to the grid computing system 150 while an application may be uninstalled, as described above. For hot objects (objects that are always needed), the TTL value may be preset to a high value to indicate a permanent storage on the storage unit 10. Likewise, for transient objects, the TTL value may be set to a small value.

The attributes 318-326 are useful for objects that have recurring user usage patterns. Attribute 318 is for specifying whether an object's usage by the user is recurring. Attribute 320 is for specifying the time of day for the recurring object. Attribute 322 is for specifying the duration of the recurring object. Attribute 324 is for specifying the day of the week for the recurring object. Attribute 326 is for specifying the name of the user of the recurring object. For example, if everyday at noon the user wants to use application XYZ. In this case, the attribute 318 is set to specify that use of application XYZ is recurring. Further, the attribute 316 is set to a very small TTL value such that when use of application XYZ is completed, the application XYZ is immediately uninstalled. Thus, the attribute 320 may be used to proactively download and install the application XYZ from the grid computing system 150 in advance of the time when it is needed.

Figure 4A:
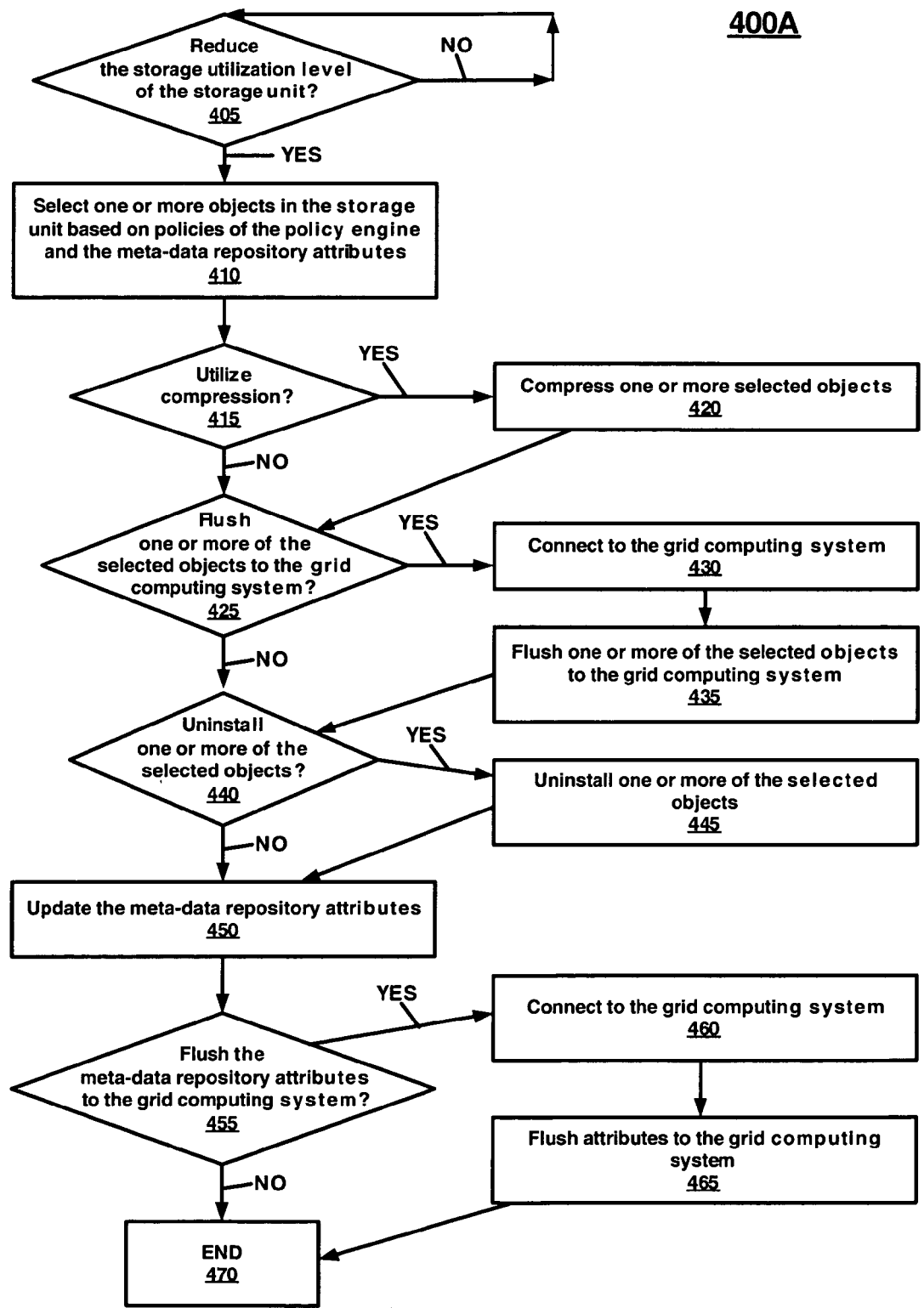
FIG. 4A illustrates a flow chart showing a method of managing storage utilization level of a storage unit of a device in accordance with an embodiment of the present invention.

FIG. 4A illustrates a flow chart showing a method 400A of managing storage utilization level of a storage unit 10 of a device 100 in accordance with an embodiment of the present invention.

At 405, it is determined whether to reduce the storage utilization level of the storage unit 10. The storage unit stores a plurality of objects (e.g., applications and data files). Attributes are associated with the objects and stored in the meta-data repository 60. The need to reduce the storage utilization level of the storage unit 10 may arise due to any of a variety of reasons. One reason is that a storage shortage condition has been triggered. That is, an object to be stored in the storage unit 10 is larger than the free space available in the storage unit 10. Another reason is that the storage utilization level of the storage unit 10 has satisfied a preset threshold. The meta-data repository 60 attributes may trigger the need to reduce the storage utilization level of the storage unit 10. Also, the policy engine 50 and the predictive service 70 may trigger the need to reduce the storage utilization level of the storage unit 10.

Additionally, if the device 100 includes a service for managing access to objects as described in FIG. 2B, the meta-data repository 61 attributes, the wrapper services 90, and the pre-install service 92 may trigger the need to reduce the storage utilization level of the storage unit 10.

Continuing at 410, if there is a need to reduce the storage utilization level of the storage unit 10, the storage service 40 selects one or more objects in the storage unit 10 based on policies of the policy engine 50 and the meta-data repository 60 attributes. The storage service 40 may connect to the grid computing system 150 to retrieve flushed meta-data repository 60 attributes.

At 415 to 445, the storage service 40 reduces the storage utilization level of the storage unit 10. The storage service 40 may use the grid computing system 150, the policies of the policy engine 50, and meta-data repository 60 attributes of the selected objects.

In particular, at 415, the storage service 40 determines whether to utilize compression to reduce the storage utilization level of the storage unit 10. If the storage service 40 decides to use compression, one or more selected objects (e.g., data files) are compressed, at 420. Any compression algorithm may be utilized.

Further, at 425, the storage service 40 determines whether to flush one or more of the selected objects (e.g., data files) to the grid computing system 150 to reduce the storage utilization level of the storage unit 10. If the storage service 40 decides to flush one or more of the selected objects (e.g., data files) to the grid computing system 150, the storage service 40 connects to the grid computing system 150, at 430. Then, the storage service 40 flushes one or more of the selected objects (e.g., data files) to the grid computing system 150, at 435. The selected objects may be stored at storage nodes 180 of the grid computing system 150.

At 440, the storage service 40 determines whether to uninstall one or more of the selected objects (e.g., applications) to reduce the storage utilization level of the storage unit 10. If the storage service 40 decides to uninstall one or more of the selected objects (e.g., applications), the storage service 40 uninstalls one or more of the selected objects (e.g., applications), at 445. The grid computing system 150 stores a copy of the uninstalled objects.

Moreover, at 450, the storage service 40 updates the meta-data repository 60 attributes of the selected objects. At 455, the storage service 40 determines whether to flush the meta-data repository 60 attributes to the grid computing system 150 to make space available in the meta-data repository 60. If the storage service 40 decides to flush the meta-data repository 60 attributes to the grid computing system 150, the storage service 40 connects to the grid computing system 150, at 460. Then, the storage service 40 flushes the meta-data repository 60 attributes to the grid computing system 150, at 465. The meta-data repository 60 attributes may be stored at storage nodes 180 of the grid computing system 150. This method 400A ends at 470.

Figure 4B:
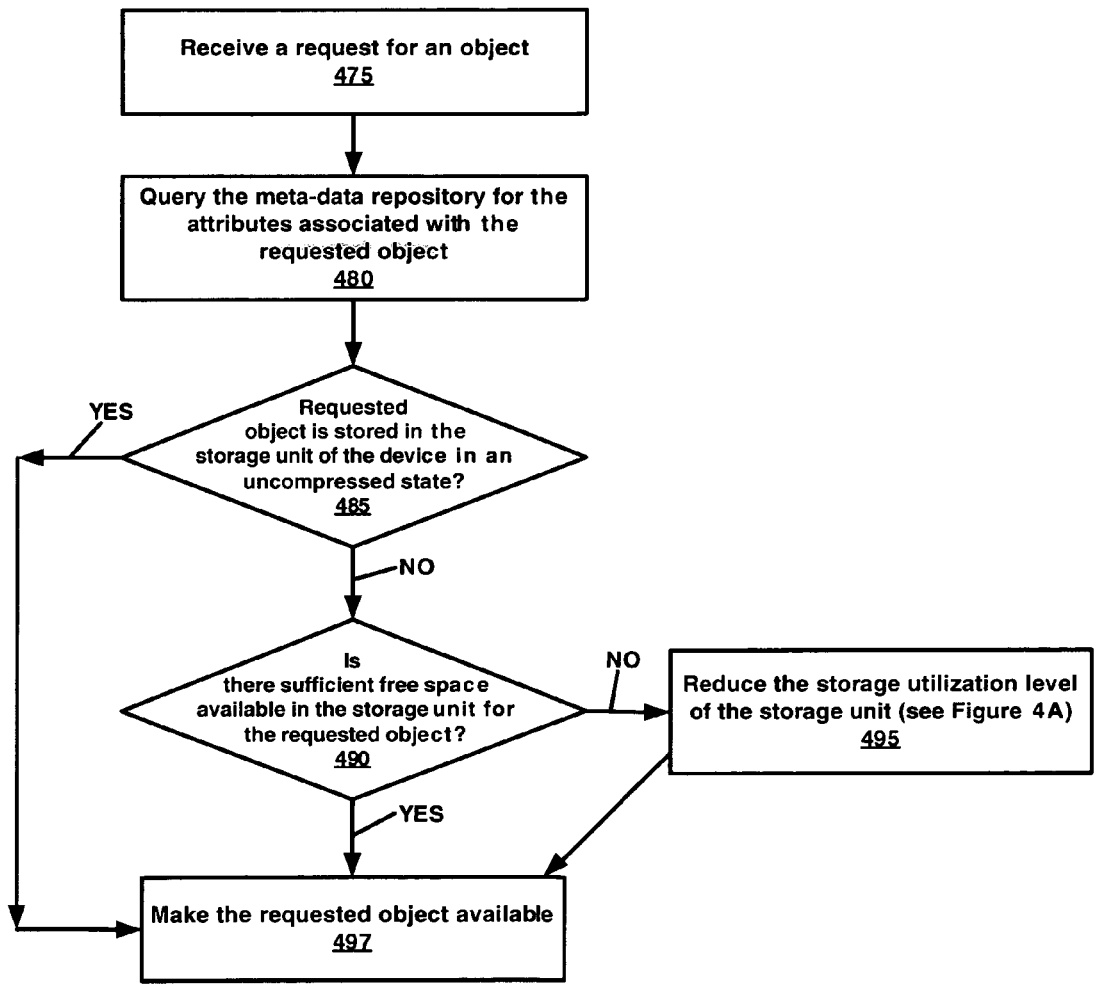
FIG. 4B illustrates a flow chart showing operation of memory management in response to a request for an object in accordance with an embodiment of the present invention.

FIG. 4B illustrates a flow chart 400B showing operation of memory management in response to a request for an object in accordance with an embodiment of the present invention.

At 475, a request for an object (e.g., application or data file) is received, wherein the object is being managed by the storage service 40 of the device 100. The request may originate from the user, the policy engine 50, the predictive service 70, or the meta-data repository 60 attributes.

Additionally, if the device 100 includes a service for managing access to objects as described in FIG. 2B, the meta-data repository 61 attributes, the wrapper services 90, and the pre-install service 92 may trigger the request for an object.

Moreover, at 480, the storage service 40 queries the meta-data repository 60 for the attributes associated with the requested object. The storage service 40 may connect to the grid computing system 150 to retrieve flushed meta-data repository 60 attributes.

Continuing, at 485, the storage service 40 determines whether the requested object is stored in the storage unit 10 of the device 100 in an uncompressed state. If the requested object is stored in the storage unit 10, the storage service 40 makes the requested object available, at 497.

If the requested object is not stored in the storage unit 10 in an uncompressed state, the storage service 40 determines whether there is sufficient free space available in the storage unit 10 for the requested object, at 490. If there is not sufficient free space available in the storage unit 10 for the requested object, the storage service 40 reduces the storage utilization level of the storage unit 10 as described in FIG. 4A, at 495. Then, the storage service 40 makes the requested object available, at 497. That is, if the requested object is compressed, the storage service 40 un-compresses the requested object. For a flushed data file, the storage service 40 connects to the grid computing system 150 to retrieve/download the flushed data file. For an uninstalled application, the storage service 40 connects to the grid computing system 150, downloads the uninstalled application, and installs the application.

FIG. 5 illustrates a meta-data repository 61 for a wrapper service 90 (FIG. 2B) in accordance with an embodiment of the present invention. As shown in FIG. 5, the meta-data repository 61 has a plurality of attributes 510 for each object (e.g., applications). These attributes 510 may be set by the user, by the wrapper service 90, or by the pre-install service 92 (FIG. 2B). Moreover, some of the attributes 510 are not used for some types of objects. Similar attributes may be gathered for data files.

Figure 6:
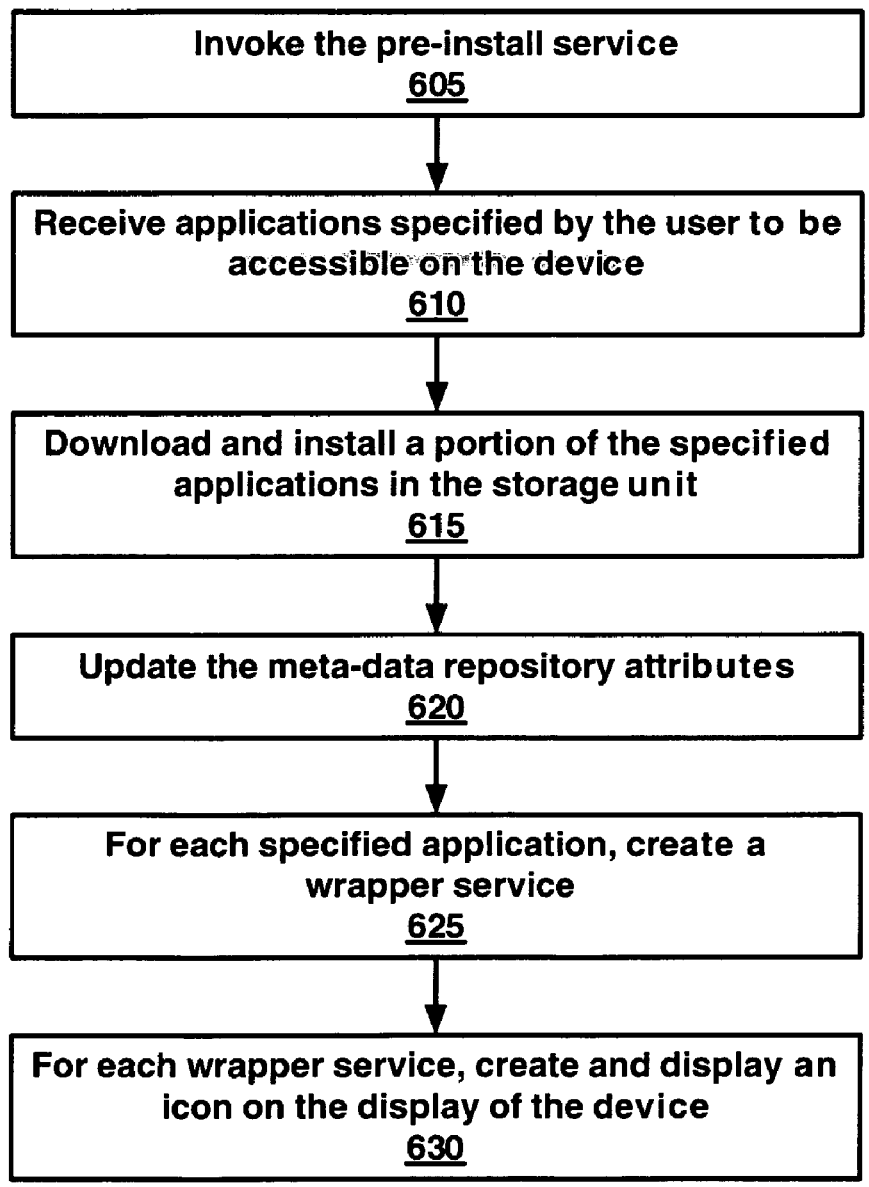
FIG. 6 illustrates a flow chart showing a method of providing a wrapper service for each object to be accessed on a device by a user in accordance with an embodiment of the present invention.

FIG. 6 illustrates a flow chart showing a method 600 of providing a wrapper service 90 for each object to be accessed on a device 100 by a user in accordance with an embodiment of the present invention. Although the discussion will focus on applications, the discussion is applicable to data files and other types of objects.

At 605, the pre-install service 92 is invoked. It may be invoked by the user. Also, it may be automatically invoked upon initial use of the device 100. The pre-install service 92 receives applications specified by the user to be accessible on the device 100, at 610.

Further, at 615, the pre-install service 92 downloads and installs a portion of the specified applications in the storage unit 10. The applications may be obtained from the grid computing system 150. The pre-install service 92 determines which specified applications to download and install based on available space in the storage unit 10 and policies such as default policies, user-specified policies, and policies based on user usage patterns of the device 100.

At 620, the pre-install service 92 updates the meta-data repository 61 attributes. For each specified application, the pre-install service 92 creates a wrapper service 90, at 625. Furthermore, at 630, an icon 95 for each wrapper service 90 is created and displayed on the display 30 of the device 100.

Figure 7:
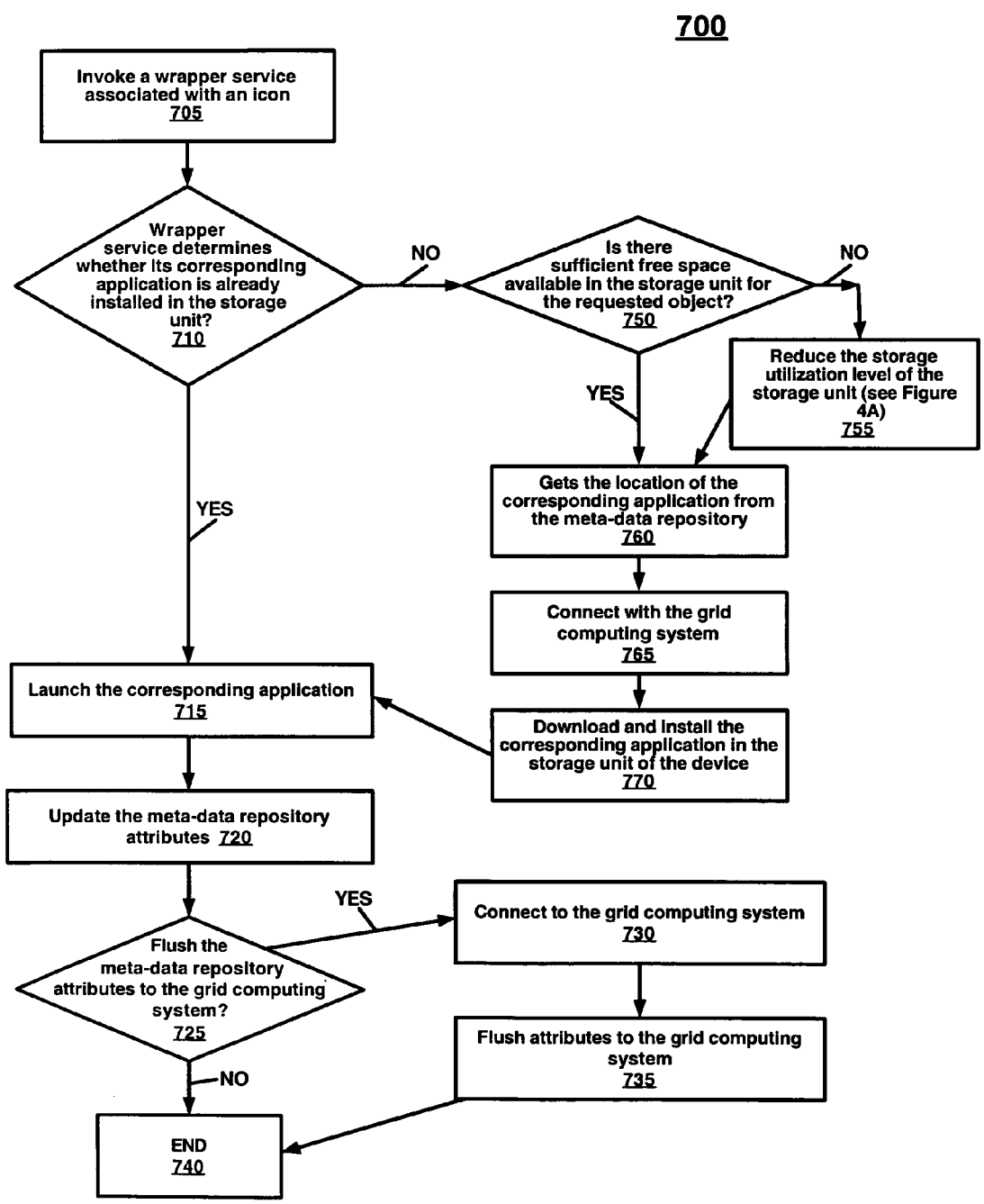
FIG. 7 illustrates a flow chart showing a method of providing a user of a device access to a plurality of objects irrespective of storage locations of the objects in accordance with an embodiment of the present invention.

FIG. 7 illustrates a flow chart showing a method 700 of providing a user of a device 100 access to a plurality of objects irrespective of the storage locations of the objects in accordance with an embodiment of the present invention. Although the discussion will focus on applications, the discussion is applicable to data files and other types of objects.

At 705, a wrapper service 90 associated with an icon 95 is invoked. The user may click on the icon 95 to invoke the wrapper service 90. Also, the predictive service 70 may invoke the wrapper service 90. At 710, the wrapper service 90 determines whether its corresponding application is already installed in the storage unit 10. The wrapper service 90 queries the meta-data repository 61 for the attributes associated with the corresponding application. The wrapper service 90 may connect to the grid computing system 150 to retrieve flushed meta-data repository 61 attributes.

If the corresponding application is already installed in the storage unit 10, the wrapper service 90 launches the corresponding application, at 715.

Moreover, at 720, the wrapper service 90 updates the meta-data repository 61 attributes of the corresponding application. At 725, it is determined whether to flush the meta-data repository 61 attributes to the grid computing system 150 to make space available in the meta-data repository 61. If the meta-data repository 60 attributes are to be flushed to the grid computing system 150, a connection to the grid computing system 150 is made, at 730. Then, the meta-data repository 61 attributes are flushed to the grid computing system 150, at 735. The meta-data repository 61 attributes may be stored at storage nodes 180 of the grid computing system 150. This method 700 ends at 740.

At 710, if the corresponding application is not already installed in the storage unit 10, the method 700 proceeds to 750.

Continuing at 750, it is determined whether there is sufficient free space available in the storage unit 10 for the corresponding application. If there is not sufficient free space available in the storage unit 10 for the corresponding application, the storage service 40 reduces the storage utilization level of the storage unit 10 as described in FIG. 4A, at 755.

At 760, the wrapper service 90 gets the location of the corresponding application from the meta-data repository 61. Further, at 765, the wrapper service 90 connects with the grid computing system 150. At 770, the wrapper service 90 downloads and installs the corresponding application in the storage unit 10 of the device 100. Then, the method 700 proceeds to 715, which is described above.

Utility Services

Embodiments of the present invention provide a grid computing system and method for managing utility service content. The utility service content may include, but is not limited to, audio (e.g., a music service), video (e.g., a movie service), games, and graphics. The grid computing system allows a single copy of the utility service content to be stored in the grid computing system, rather than each user device storing its own copy. A user can offload content to the grid computing system to make room for storage of additional content. Further, after purchasing the content, the user can have the content stored in the grid computing system. The user can download the content at the user's convenience. Moreover, the user can download the content to multiple user devices. For example, on different occasions the user might download content to a PDA, a cell-phone, or a device dedicated to playing music.

In an embodiment, the grid computing system allows the user to create user profiles, which define respective sets of content. For example, a user profile might define a music playlist. The grid computing system stores utility service content and a repository of user profiles. The grid computing system accepts user requests for content associated with a user profile. The grid distributed resource manager locates and accesses a requested portion of the utility service content from the grid computing system to fill a user request for content associated with the user profile.

Figure 8:
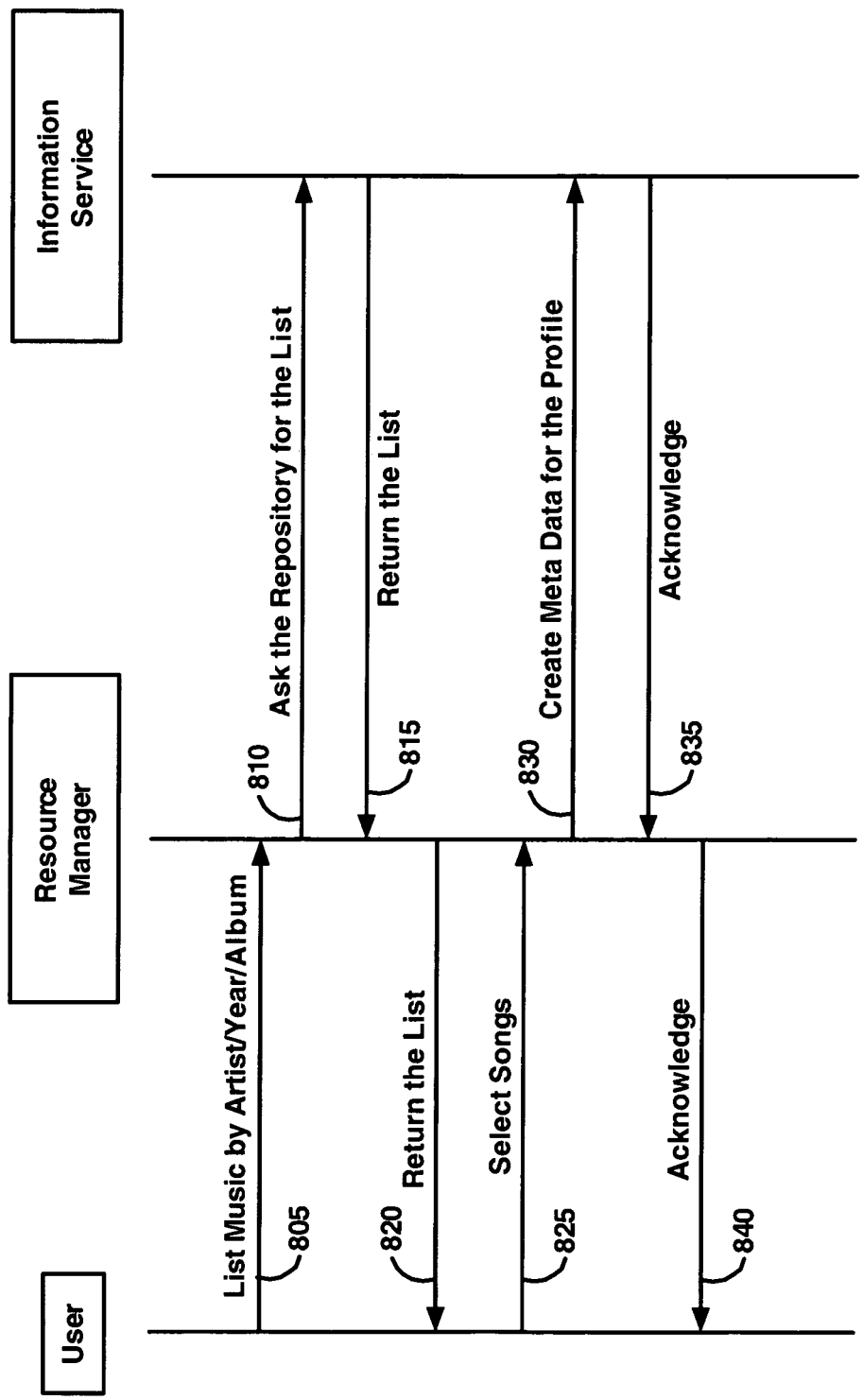
FIG. 8 is a diagram illustrating creation of a client profile in accordance with an embodiment of the present invention.

The following discussion provides an example in which the utility service is a music service. However, the utility service is not limited to a music service. FIG. 8 is a diagram illustrating creation of a client profile in accordance with an embodiment of the present invention. The user sends a request to the resource manager, requesting a list of music from which the user may select (arrow 805). The user may request that the list be categorized by, for example, artist, year, or album. The resource manager invokes the information service, requesting that a selection list be provided (arrow 810). The information service has access to persistent information about the utility service content. For example, the information service has access to a repository that contains meta-data describing the utility service content. The information service obtains the requested selection list from the repository and returns it to the resource manager (arrow 815). The resource manager forwards the selection list to the user (arrow 820).

Continuing with the discussion of FIG. 8, the user then selects desired songs, or the like, from the list and forwards the selection to the resource manager (arrow 825). The resource manager invokes the information service to create meta-data for the user profile (arrow 830). After the resource manager receives acknowledgment that the profile was created (arrow 835), the resource manager sends an acknowledgment to the user (arrow 840).

Figure 9:
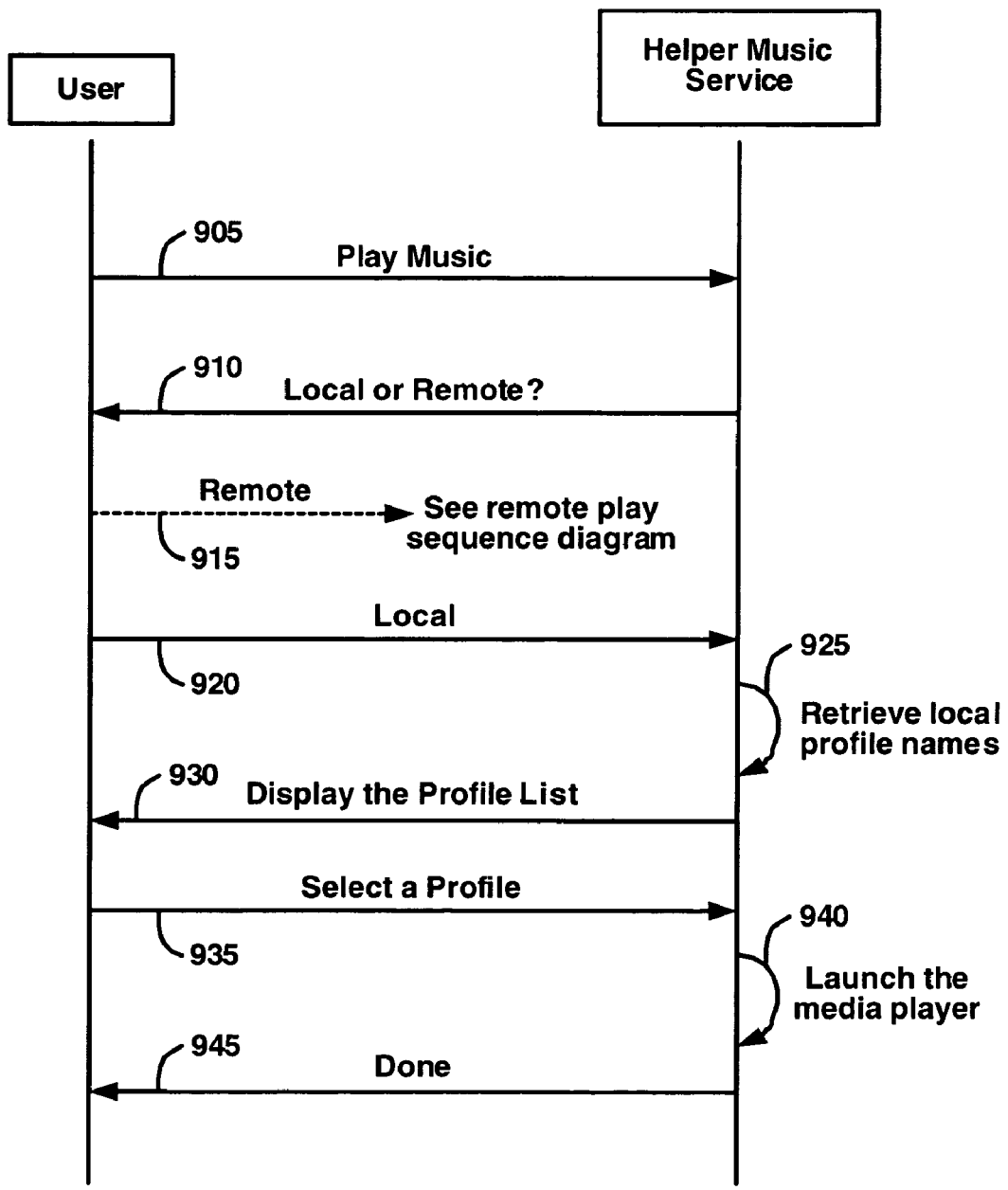
FIG. 9 is a diagram illustrating a user invoking a helper music service on the user's device to play music a standalone fashion, in accordance with an embodiment of the present invention.
Figure 10:
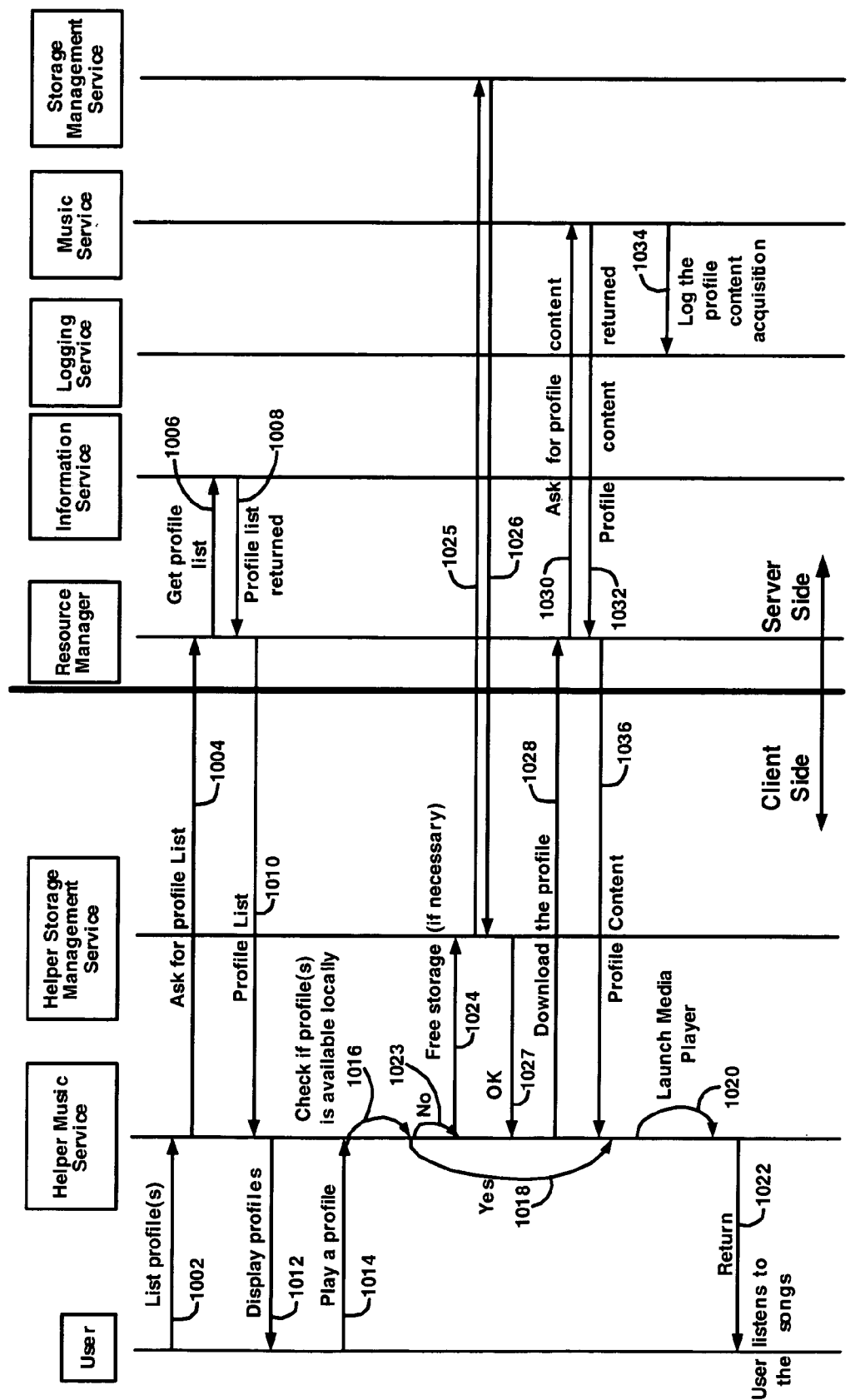
FIG. 10 is a diagram illustrating a user playing music on the user's device by downloading the content from the grid infrastructure, in accordance with an embodiment of the present invention.

The user device has a client-side (or helper) utility service, which facilitates communication with the grid computing system and manages utility service operation on the user device. FIG. 9 is a diagram illustrating a user invoking a helper music service on the user's device to play music a standalone fashion, in accordance with an embodiment of the present invention. In some cases, the musical content that a user wishes to play may already be stored on the user device. Thus, an embodiment of the present invention allows the user device to play utility (e.g., music) content while disconnected from grid computing system. To invoke the client-side helper music service, the user may click on a music service icon, or the like, on the user device (arrow 905). In response, the (client-side) helper music service queries whether the user wishes to play content that is currently stored on the user device or wishes to download a new user profile (e.g., new music content) from the grid infrastructure (arrow 910). If the user requests music that is not currently stored on the user device, then various acts depicted in FIG. 10 are performed. If the user requests music that is currently stored on the user device (arrow 920), the helper music service retrieves one or more names associated with local user profiles (arrow 925).

Continuing with the discussion of FIG. 9, local profile names are displayed to the user (arrow 930). The user selects one of the local user profiles (arrow 935) by for example, clicking on the name of the user profile. In response, the helper music service launches a media player (arrow 940) and begins by playing the first piece of content in the user profile (945).

FIG. 10 is a diagram illustrating a user playing music on the user's device by downloading the content from the grid infrastructure, in accordance with an embodiment of the present invention. The user invokes the helper music service and requests a list of user profiles (arrow 1002). The client-side helper music service contacts the resource manager, requesting a list of user profiles for this user (arrow 1004). In response, the resource manager invokes the information service to obtain the user profile list (arrow 1006). The information service accesses the repository to obtain the user profile list and returns it to the resource manager (arrow 1008). The resource manager forwards the profile list to the helper music service (arrow 1010), which displays the user profiles on the user device (arrow 1012).

Continuing with the discussion of FIG. 10, the user requests that the client-side music helper assist in playing a selected user profile (arrow 1014). The client-side helper music service searches storage on the user device to determine if the selected user profile (or profiles) is available locally (arrow 1016). If the user profile is available locally (arrow 1018), the client-side helper music service launching a media player (arrow 1020) and begins by playing the first piece of content in the user profile (1022).

On the other hand, if the user profile is not available locally (arrow 1023), then the client-side helper music service invokes the client-side helper storage management service (arrow 1024) to determine whether storage on the device needs to be freed to accommodate the desired content. Embodiments for managing storage utilization on a device coupled to a grid computing environment are discussed herein. If storage needs to be freed on the client device, the helper storage management service and storage management service communicate to free up client storage (arrows 1025, 1026) The client-side helper storage management service returns an "OK" to the client-side helper music service after managing client storage utilization (arrow 1027).

Continuing with the discussion of FIG. 10, the client-side helper music service then contacts the resource manager and requests that the selected user profile be downloaded to the user device (arrow 1028). The resource manage invokes the music service, requesting the profile content (arrow 1030), which the music service returns to the resource manager (arrow 1032). The music service also invokes the logging service to log the user acquisition of the profile content (arrow 1034).

The resource manager then forwards the profile content to the client-side helper music service (arrow 1036). Now that the content is available locally, the client-side helper music service launching a media player (arrow 1020) and begins by playing the first piece of content in the newly downloaded user profile (1022).

Figure 11:
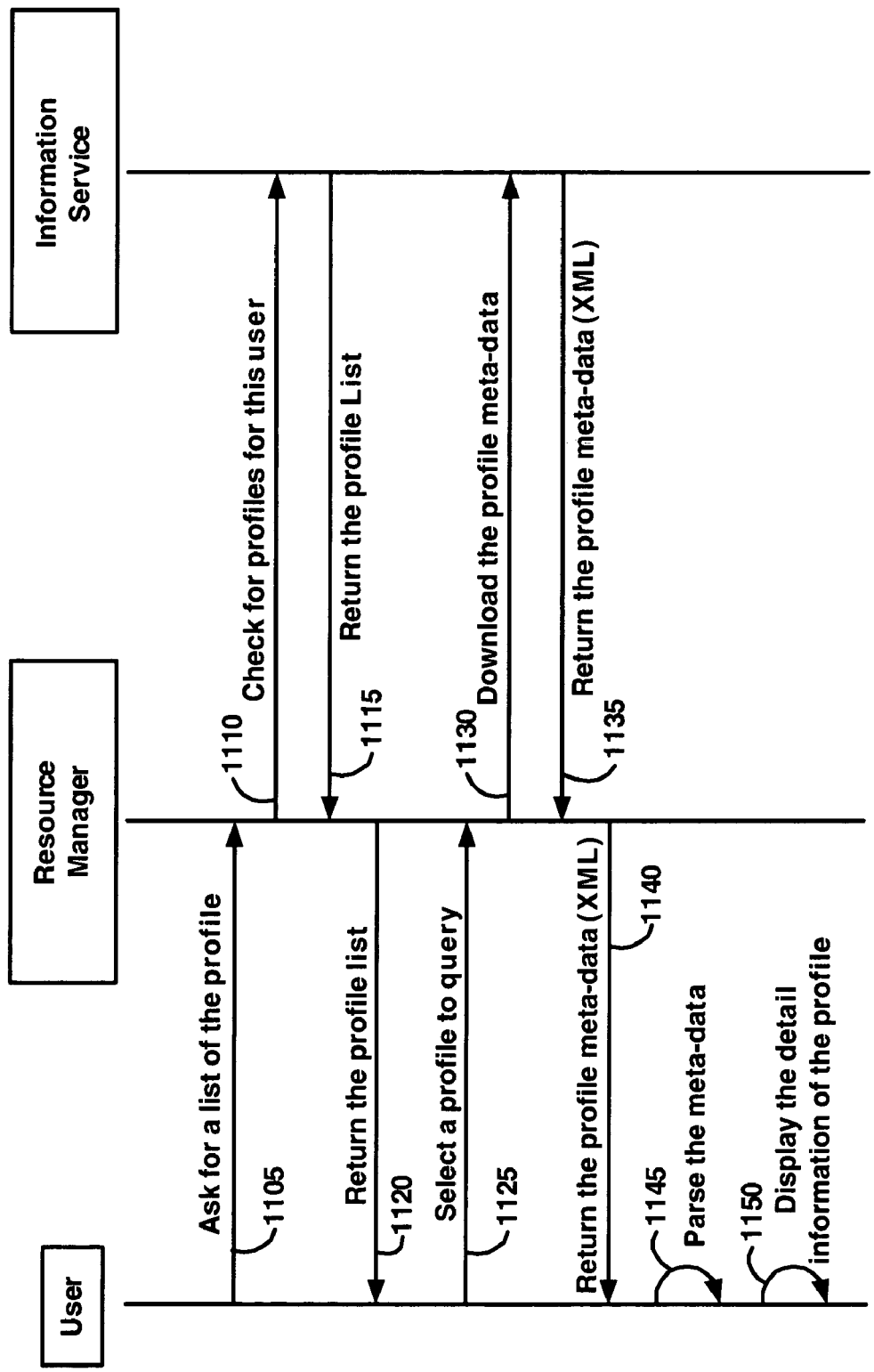
FIG. 11 is a diagram illustrating a user querying the grid infrastructure for meta-data associated with a user profile, in accordance with an embodiment of the present invention.

FIG. 11 is a diagram illustrating a user querying the grid infrastructure for meta-data associated with a user profile, in accordance with an embodiment of the present invention. A user may wish to perform such an action to obtain detailed information about a user profile, such as artists, titles, etc. In this case, the user contacts the resource manager and requests a list of user profiles for this user (arrow 1105). In response to the user request, the resource manager invokes the information service, requesting profiles for this user (arrow 1110). The information service examines the repository for profiles for this user and returns the profiles to the resource manager (arrow 1115). The resource manager forwards the user profiles to the user (arrow 1120).

Continuing with the discussion of FIG. 11, the user selects a profile from the downloaded list and indicates the selection to the resource manager (arrow 1125). The resource manager invokes the information service to obtain meta-data for the user profile (arrow 1130). The meta-data may be in the form of an XML document, although the meta-data format is not limited to XML. The information service searches the repository for the meta-data associated with this user profile and returns it to the resource manager (arrow 1135). The resource manager forwards the profile meta-data to the user (arrow 1140). The user then parses the meta-data (arrow 1145) and displays details of the selected user profile (arrow 1150).

In one embodiment, the grid computing system synchronizes pre-fetching of utility service content from the grid with its consumption on the user device. For purposes of illustration, the utility service is a media service in following discussion; however, the utility service is not limited to a media service. When a user wishes to play media service content (e.g., music, video) that is not cached on the user device, a portion of the media content is fetched from the grid and a media player is launched on the user device to begin playing the media. As media is consumed on the user device, the media player sends messages to the grid computing system regarding media consumption. The grid computing system uses these messages to synchronize pre-fetching of additional portions of the media content with consumption on the user device. This allows the user device to utilize a relatively small buffer for the media content, thus efficiently uses device storage.

Figure 12:
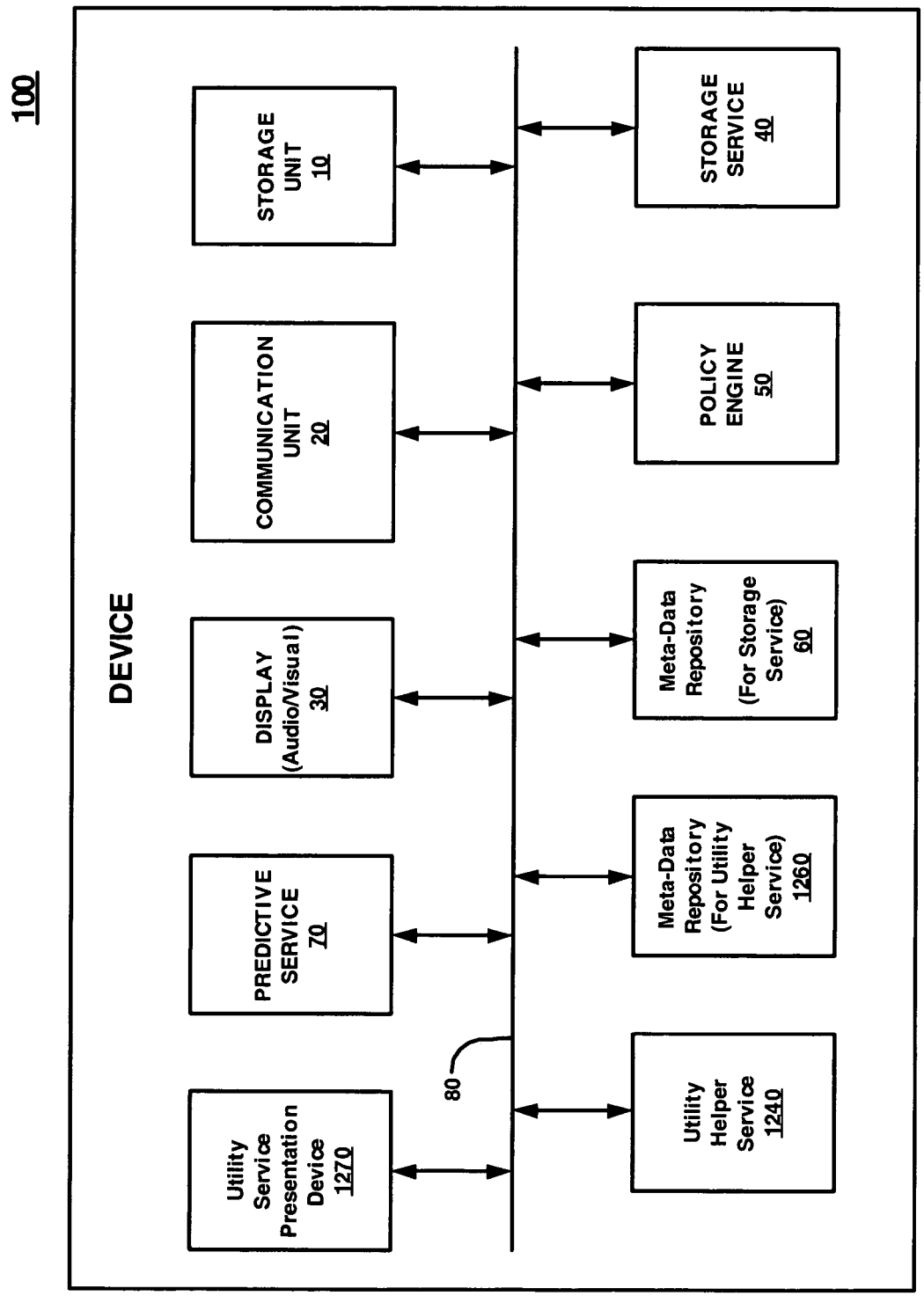
FIG. 12 illustrates a block diagram of the device 100 of FIGS. 1A and 1B in accordance with an embodiment of the present invention.

FIG. 12 illustrates a block diagram of the device 100 of FIGS. 1A and 1B in accordance with an embodiment of the present invention. As depicted in FIG. 12, the device 100 includes a storage unit 10, a communication unit 20, an audio/visual display 30, a storage service 40, a policy engine 50, a meta-data repository 60, a predictive service 70, one or more communication buses 80, a utility helper service 1240 and a meta-data repository 1260 for utility helper service. In one embodiment, the meta-data repository 1260 is stored in storage unit 10. The utility service presentation device 1270 receives the utility service content, processes it, and presents it on the display 20, as an audio or visual signal. In one embodiment, the utility service presentation device 1270 is a media player capable of playing music, video, etc.

Figure 13:
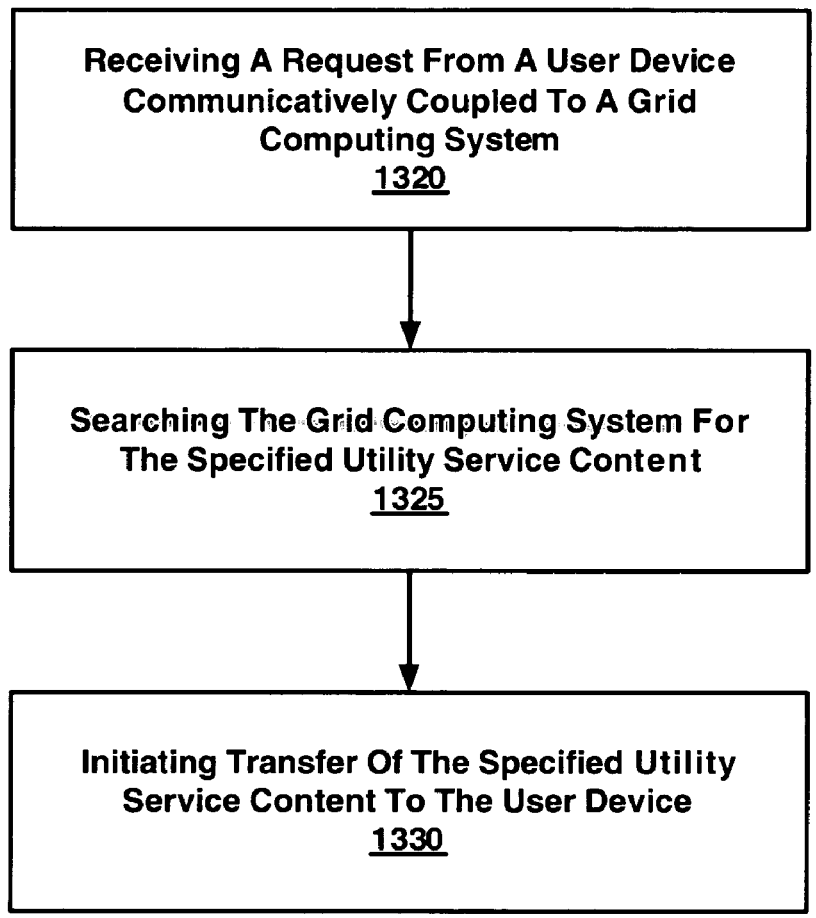
FIG. 13 is a flowchart illustrating a process of providing a utility service, in accordance with an embodiment of the present invention.

FIG. 13 is a flowchart illustrating a process 1300 of providing a utility service, in accordance with an embodiment of the present invention. Step 1320 is receiving a request from a user device communicatively coupled to a grid computing system. The request comprising a user profile specifying utility service content.

Step 1325 is searching the grid computing system for the specified utility service content. Step 1330 is initiating transfer of the specified utility service content to the user device.

Figure 14:
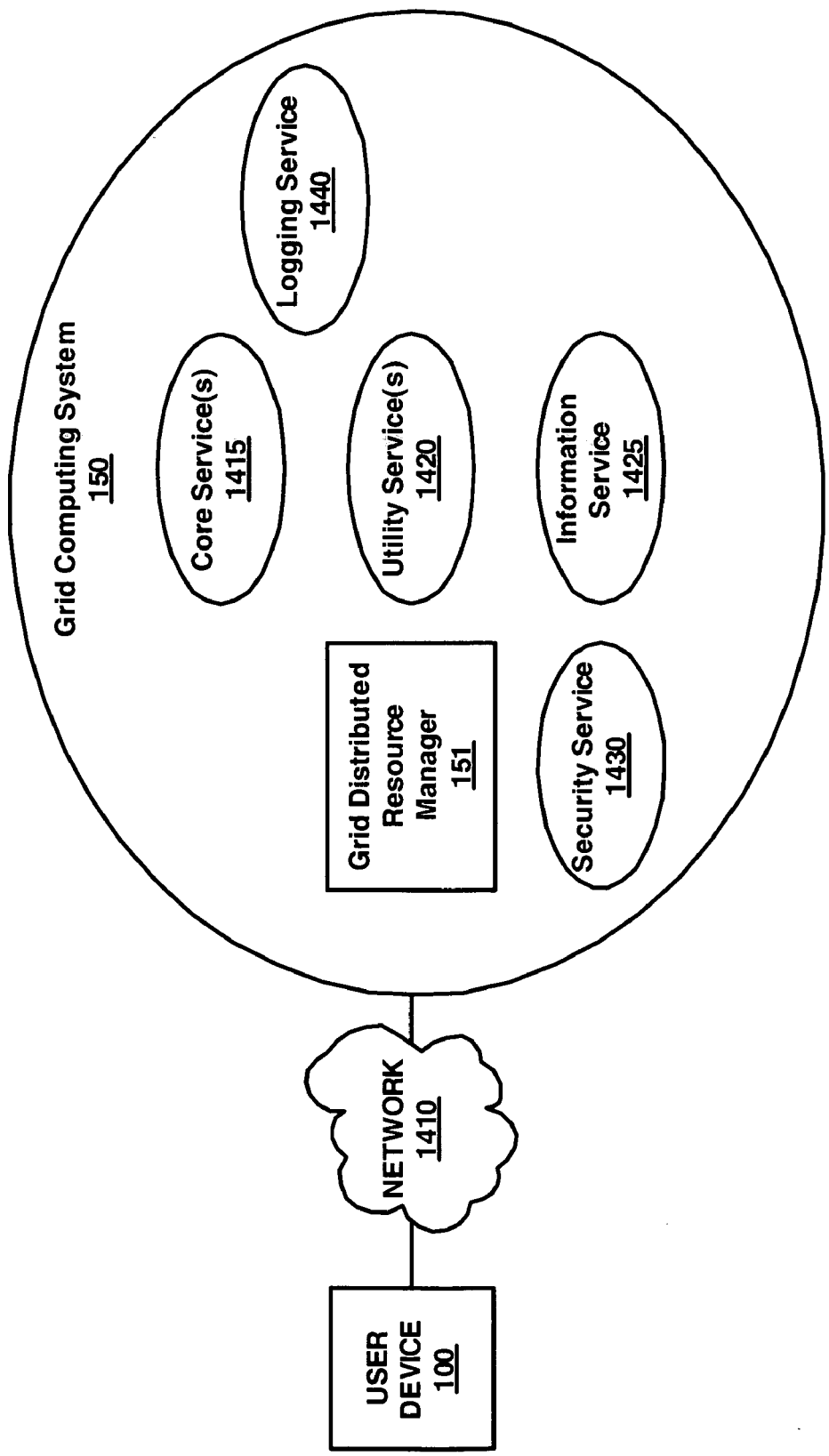
FIG. 14 is a diagram illustrating services provided by a grid computing system, in accordance with an embodiment of the present invention.

FIG. 14 is a diagram illustrating services provided by a grid computing system, in accordance with an embodiment of the present invention. The core services 1415 may include application services and storage services. The utility services 1420 may include music services, video services, game services, graphics services, etc. The logging service 1440 may be used to log purchases of utility content. The information service 1425 may be used to locate and access utility content that is distributed within the grid computing system 150. Further, the information service 1425 may locate and access utility content that is outside of the grid computing system 150, in one embodiment. The security service 1430 may be used to facilitate a log in process via the network 1410. For example, the security service 1430 may be used to authenticate users and manage passwords, in order to establish user accounts and allow users to access their user profiles.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A grid computing system comprising:
    at least one node for storing utility service content;
    a repository for storing user profiles that define respective portions of said utility service content, wherein said user profiles are stored separately from said utility service content, and wherein a particular user profile is created as a result of a particular user specifying interest in a particular portion of utility service content, wherein said user profiles and said utility service content are associated with a particular user device for access;
    a grid distributed resource manager coupled to said repository and to said at least one node, wherein said grid distributed resource manager is operable to invoke an information service to provide a selection list to said user, receive a selection from said user, and create meta-data for said user profile based on said selection, wherein said grid distributed resource manager is further operable to access a requested portion of said utility service content associated with said particular user device from said at least one node based on a received user profile, and wherein said grid distributed resource manager is further operable to invoke said information service to provide meta-data for a second user profile;
    a storage manager operable to cause said requested portion to be flushed from said particular user device to said grid computing system after said particular user device is used to access said requested portion, wherein said requested portion is capable of being played on said particular user device; and
    a predictive service to pre-fetch objects which are predicted to be needed in the near future in order to insure availability of said objects.

2. A system as recited in claim 1, wherein said grid distributed resource manager is further operable to facilitate user creation of said user profiles and to store said user profiles in said repository.

3. A system as recited in claim 1, further comprising a logging service for logging a description of said requested portion.

4. A system as recited in claim 1, wherein said storage manager is operable to manage storage of said requested portion on said particular user device communicatively coupled to said grid computing system.

5. A system as recited in claim 4, wherein said storage manager is further operable to monitor consumption of a first part of said requested portion on said particular user device in order to pre-fetch a second part of said requested portion.

6. A system as recited in claim 1, further comprising an information service for mining said at least one node for meta-data describing said utility service content.

7. A system as recited in claim 1, wherein said utility service content comprises audio content.

8. A system as recited in claim 1, wherein said utility service content comprises video content.

9. A system as recited in claim 1, further comprising a utility service presentation device operable to send messages to said grid computing system indicating consumption of said utility service content on said user device coupled to said grid computing system.

10. A method of providing a utility service, said method comprising:
    receiving a request from a user device communicatively coupled to a grid computing system, said request comprising a user profile specifying utility service content, wherein said user profile is stored separately from said utility service content and wherein said user profile is created as a result of a user specifying interest in said utility service content;
    invoking an information service to provide a selection list to said user device;
    invoking said information service to create meta-data for said user profile based on a selection received from said user device;
    searching said grid computing system for a specified utility service content associated with said user device;

initiating transfer of said specified utility service content to said user device wherein a transferred utility service is capable of being played on said user device;

flushing said specified utility service content from said user device to said grid computing system after said user device is used to access said specified utility service content;

invoking said information service to provide meta-data associated with a second user profile; and predicting objects which will be needed in the near future so that said objects may be pre-fetched in order to insure availability of said objects.

11. A method in accordance with claim 10, further comprising:

transferring meta-data describing said utility service content to said user device;

receiving a selection of said meta-data from said user device; and storing said user profile in a repository in said grid computing system based on a received selection of meta-data.

12. A method in accordance with claim 10, further comprising:

logging a description of utility service content transferred to said user device.

13. A method in accordance with claim 10, further comprising:

determining if a desired utility content is stored on said user device;

accessing said utility content stored on said user device if said desired utility content is stored on said user device; and requesting said grid computing system for said desired utility content if said desired utility content is not stored on said user device.

14. A method in accordance with claim 10, further comprising:

said grid computing system managing storage of said specified utility service content on said user device.

15. A method in accordance with claim 10, further comprising:

synchronizing delivery of a portion of said specified utility service content with consumption of a previously delivered portion of said specified utility service content on said user device.

16. A method in accordance with claim 10, further comprising:

receiving a request from said user device for user profile lists;

searching a database for said user profile lists; and transferring said user profile lists to said user device to display said user profiles on said user device.

17. A method in accordance with claim 10, further comprising:

mining said grid computing system for meta-data describing said utility service content.

18. A device comprising:

a communication unit operable to communicate with a grid computing system;

a storage unit coupled to said communication unit and operable to store utility service content;

a meta-data repository coupled to said communication unit and operable to store user profiles describing utility service content; and a utility helper service coupled to said communication unit and operable to:

determine if utility content specified by a requested user profile is stored in said storage unit, wherein said user profile is stored separately from said utility content, wherein said user profile was created as a result of a user specifying interest in said utility content, and wherein said utility content is capable of being played on a user device;

access said utility content from said storage unit if a specified utility content is stored in said storage unit and is associated with said device, further;

cause said communication unit to request said grid computing system for said specified utility content if said specified utility content is not stored in said storage unit;

invoke an information service to provide a selection list to said user device;

invoke said information service to create meta-data for said user profile based on a selection made by said user device from said selection list;

cause said specified utility content to be flushed from said user device to said grid computing system after said user device is used to access said specified utility content;

invoke said information service to provide meta-data associated with a second user profile; and pre-fetch objects which are predicted to be needed in the near future in order to insure availability of said objects.

19. A device as recited in claim 18, wherein said utility helper service is further operable to cause said communication unit to request and receive a plurality of user profile lists stored at a node in said grid computing system.

20. A device as recited in claim 18, further comprising:

a policy engine including a plurality of policies; and a storage service operable to manage storage utilization level of said storage unit using said grid computing system and said policy engine.

21. A device as recited in claim 20, wherein said storage service is further operable to interact with a storage manager in said grid computing system to synchronize delivery of said utility service content with consumption of said utility service content on said device.

* * * * *